US012692344B2

(12) United States Patent
Ko et al.

(10) Patent No.: US 12,692,344 B2
(45) Date of Patent: Jul. 28, 2026

(54) COPOLYMER POLYESTER RESIN AND ADHESIVE COMPOSITION COMPRISING SAME

(71) Applicant: SK CHEMICALS CO., LTD., Seongnam-si (KR)

(72) Inventors: Jong-Kwan Ko, Seongnam-si (KR); Soon-Ki Kim, Seongnam-si (KR); Hyung-Gon Kim, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 12 days.

(21) Appl. No.: 18/707,310

(22) PCT Filed: Sep. 16, 2022

(86) PCT No.: PCT/KR2022/013899
§ 371 (c)(1),
(2) Date: May 3, 2024

(87) PCT Pub. No.: WO2023/080431
PCT Pub. Date: May 11, 2023

(65) Prior Publication Data
US 2025/0034324 A1 Jan. 30, 2025

(30) Foreign Application Priority Data
Nov. 3, 2021 (KR) ........................ 10-2021-0150087

(51) Int. Cl.
*C08G 63/183* (2006.01)
*C08G 63/85* (2006.01)
*C09J 167/06* (2006.01)

(52) U.S. Cl.
CPC ........... *C08G 63/183* (2013.01); *C08G 63/85* (2013.01); *C09J 167/06* (2013.01)

(58) Field of Classification Search
CPC .... C08G 63/16; C08G 63/183; C08G 63/127; C08G 63/181; C08G 63/85; C09J 167/02; C09J 167/06; C08L 67/00
USPC ......................................................... 156/327
See application file for complete search history.

(56) References Cited

U.S. PATENT DOCUMENTS 12,378,353 B2 * 8/2025 Shin ..................... C08G 63/183

FOREIGN PATENT DOCUMENTS

| | | |
|---|---|---|
| KR | 10-2004-0036045 A | 4/2004 |
| KR | 10-2007-0070982 A | 7/2007 |
| KR | 10-2010-0106505 A | 10/2010 |
| KR | 10-1159844 B1 | 6/2012 |
| KR | 10-2016-0014425 A | 2/2016 |
| KR | 10-2018-0103978 A | 9/2018 |

(Continued)

OTHER PUBLICATIONS

International Search Report for PCT/KR2022/013899, dated Dec. 26, 2022.

*Primary Examiner* — James D Sells

(74) *Attorney, Agent, or Firm* — Sughrue Mion, PLLC

(57) ABSTRACT

A copolymer polyester resin and an adhesive composition containing the copolymer polyester resin are disclosed. The copolymer polyester resin has a low glass transition temperature and improved hydrolysis resistance and solution storage stability. Therefore, the adhesive composition containing the copolymer polyester resin is superb in terms of hydrolysis resistance, solution storage stability, water heat resistance, and adhesiveness.

16 Claims, 4 Drawing Sheets

(56) References Cited

FOREIGN PATENT DOCUMENTS

| KR | 10-1976501 B1 | 5/2019 |
| WO | 2014/104754 A1 | 7/2014 |

* cited by examiner

[Fig. 1]
| (a) | (b) | (c) |
|---|---|---|
| 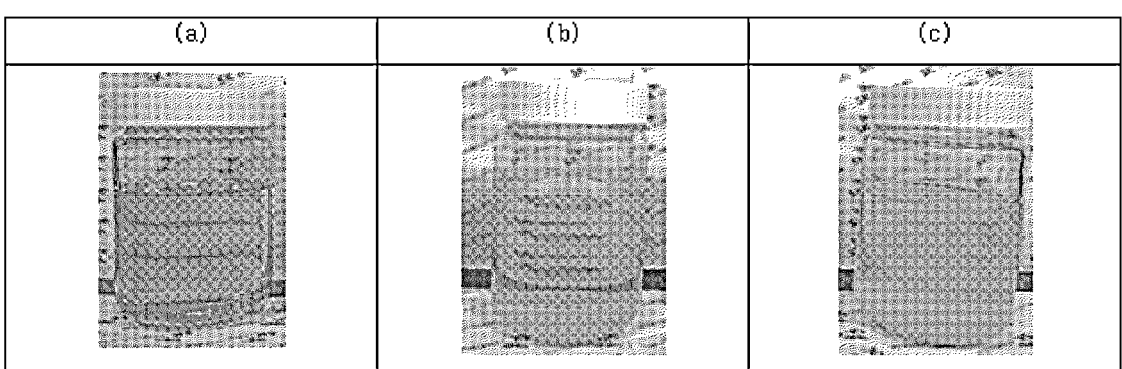 | | |

[Fig. 2]
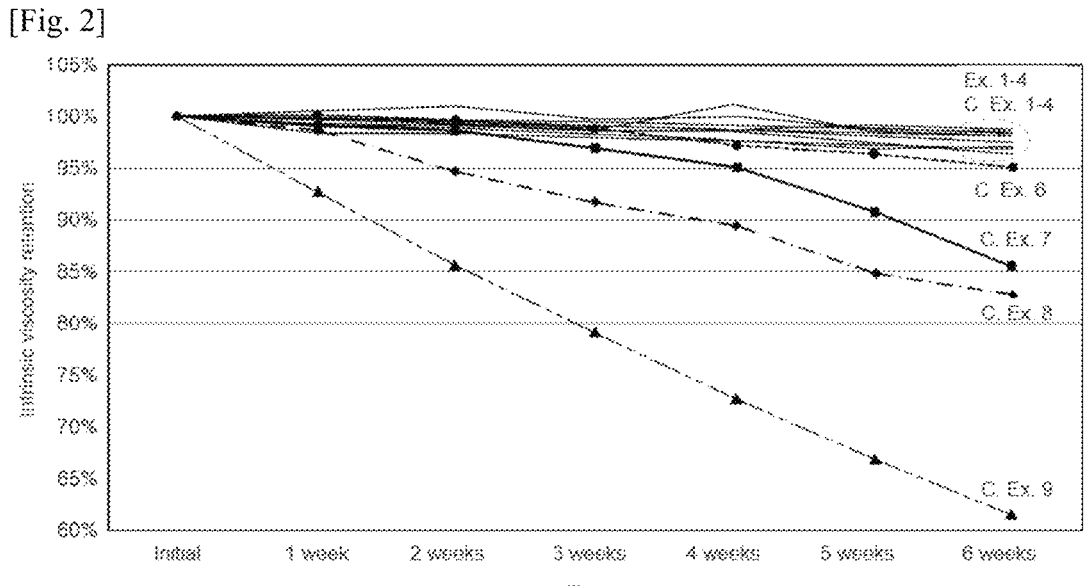

[Fig. 3]
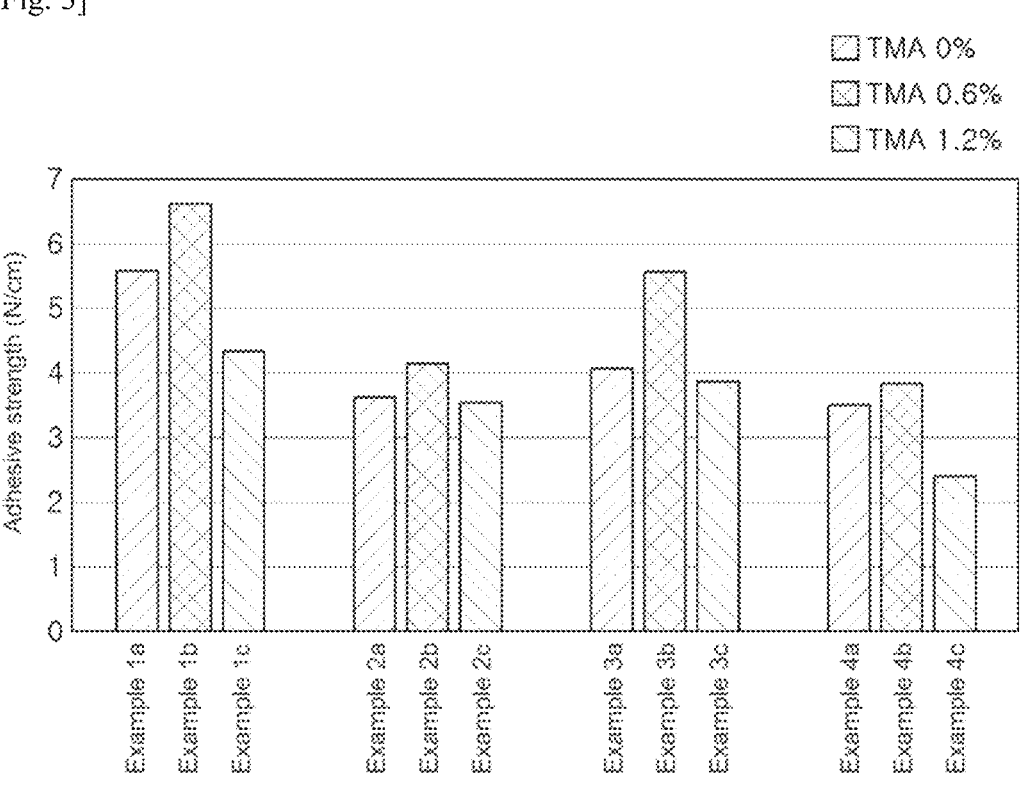

[Fig. 4]
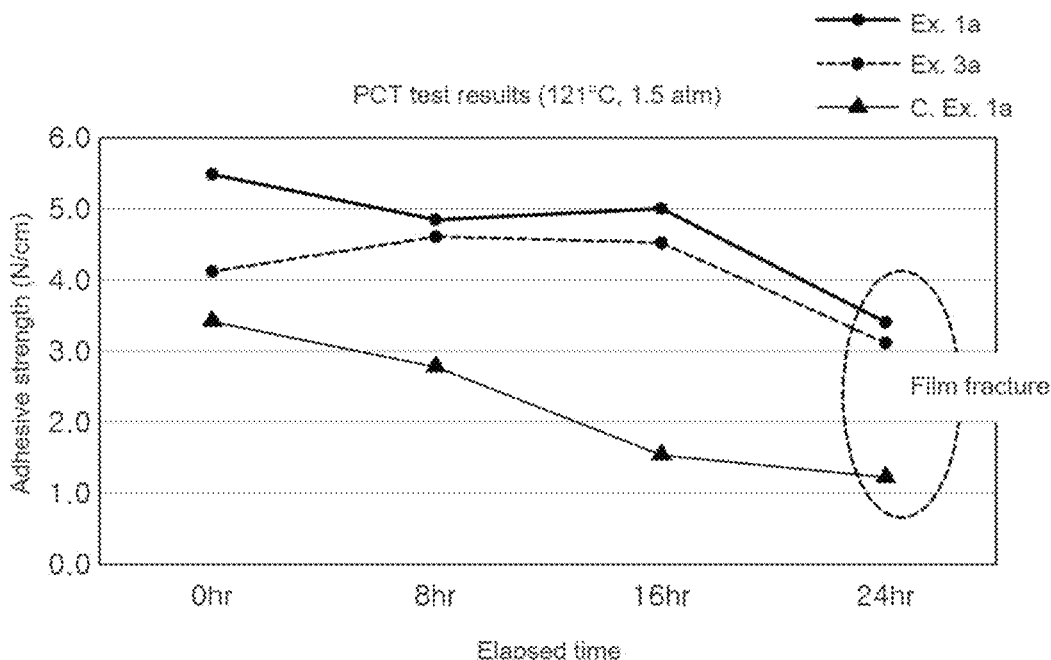

COPOLYMER POLYESTER RESIN AND ADHESIVE COMPOSITION COMPRISING SAME

CROSS REFERENCE TO RELATED APPLICATIONS

This application is a National Stage of International Application No. PCT/KR2022/013899 filed Sep. 16, 2022, claiming priority based on Korean Patent Application No. 10-2021-0150087 filed Nov. 3, 2021.

TECHNICAL FIELD

The present invention relates to a copolymerized polyester resin having a low glass transition temperature and improved hydrolysis resistance and solution storage stability and to an adhesive composition comprising the same and having excellent hydrolysis resistance, solution storage stability, hot water resistance, and adhesive strength.

BACKGROUND ART

Conventionally, polyurethane resins, polyvinyl resins, polyacrylic resins, epoxy resins, and polyester resins have been mainly studied as resins for adhesive compositions. A demand for an adhesive composition comprising a polyester resin, among the above, is gradually increasing since an adhesive composition comprising a polyester resin has excellent processability upon adhesion and can be used as an alternative to binders such as alkyd resins and vinyl resins.

In order to have sufficient adhesive strength for use in adhesive applications based on a polyester resin above mentioned, especially a polyester resin having a linear structure, it is necessary to lower its glass transition temperature. However, a polyester resin having a low glass transition temperature has a problem in that hydrolysis stability is low because water permeation may be accelerated. In addition, a polyester resin with low hydrolysis stability has a problem in that its molecular weight decreases over time during storage or once it has been applied to a product, resulting in reduced adhesive characteristics and thermal resistance. Thus, conventional adhesive compositions comprising a polyester resin are hardly applicable to special applications such as VCM adhesives that require high water resistance, solar backsheets, and secondary battery aluminum pouch adhesives.

In order to improve the hydrolysis resistance of adhesive compositions comprising a polyester resin, conventional studies have mainly focused on a method of improving the hydrolysis resistance of the polyester resin by increasing the glass transition temperature of the polyester resin.

For example, Korean Laid-open Patent Publication No. 10-2016-0014425 discloses a polyester resin copolymerized from monomers of a cyclic molecular structure having a hard molecular structure such as isosorbide or alicyclic diol is used to raise its glass transition temperature to 80° C. or higher, thereby leading to excellent thermal resistance and water resistance. However, the monomers having a hard structure reduce the flexibility of polyester resins, which is an inherent advantage thereof, and the elevated glass transition temperature prevents sufficient adhesive characteristics from being exhibited.

In addition, International Publication No. WO 2014/104754 discloses a polyester resin composition prepared by introducing a polybutylene terephthalate resin into a polyester resin, which simultaneously satisfies high impact strength and high flexural modulus and maintains the physical properties of the resin even in a high-temperature and high-humidity environment. However, the hydrolysis resistance of the resin is improved by adding a separate hydrolysis-resistant agent, rather than improving the hydrolysis resistance of the polyester resin itself, which is economically disadvantageous, and the decrease in adhesive strength by the additives is inevitable.

Meanwhile, an attempt has been made to prepare a polyester resin having a high molecular weight and a low glass transition temperature by increasing the content of fatty acids in the resin. However, as the content of fatty acids in the resin is increased, cyclic oligomers are formed as a side reaction, resulting in a problem of cloudiness that significantly reduces the solution storage stability of the polyester resin.

In order to reduce the formation of cyclic oligomers, Korean Patent No. 10-1159844 discloses a method for preparing a crystalline polyester using a titanium compound as a catalyst in an attempt to enhance the solution stability performance of adhesive resins, failing to completely remove cyclic oligomers formed as byproducts.

As discussed above, conventional studies have attempted to enhance the hydrolysis resistance of polyester adhesive compositions by introducing monomers having a high glass transition temperature, adding additional additives, or mixing other resins. In these methods, however, the use of the adhesive compositions is limited to the fields that require a high glass transition temperature such as films and coatings. They are undesirable from the viewpoint of economic feasibility and final adhesive performance, and their characteristics also fell short of the level required in the industry. In the prior art, therefore, there has been a lack of studies on the application fields of adhesive compositions comprising a polyester resin having a low glass transition temperature.

In recent years, the application ranges of adhesive compositions comprising a polyester resin are gradually expanding to retort food packaging, vinyl coated metal adhesives, solar sheets, secondary battery pouch adhesives, and the like. In particular, since battery materials for electronic devices and electric vehicles are used in various environments and in a wide range of temperatures (special high-temperature conditions such as fire or high humidity environments), the importance of maintaining the long-term performance of adhesives for the safety of electronic devices and users who use them is highly growing.

Accordingly, in the industrial field, there is an increasing demand for an adhesive composition comprising a polyester resin that can be stored for a long period of time, has excellent adhesive strength, and has enhanced hydrolysis resistance and hot water resistance.

PRIOR ART DOCUMENT

Patent Document (Patent Document 1) Korean Laid-open Patent Publication No. 10-2016-0014425
(Patent Document 2) International Publication No. WO 2014/104754
(Patent Document 3) Korean Patent No. 10-1159844

DISCLOSURE OF INVENTION

Technical Problem

An object of the present invention is to provide a copolymerized polyester resin having a low glass transition temperature of 20° C. or lower and improved hydrolysis resistance and solution storage stability, specifically a copolymerized polyester resin having excellent solution storage stability to general-purpose solvents contained in adhesives, particularly solvents with a low boiling point, and having excellent hydrolysis resistance.

Another object of the present invention is to provide an adhesive composition comprising the copolymerized polyester resin and having excellent hydrolysis resistance, solution storage stability, hot water resistance, and adhesive strength.

Solution to Problem

The copolymerized polyester resin of the present invention comprises a repeat unit derived from two or more dicarboxylic acid components and a repeat unit derived from two or more diol components, wherein the dicarboxylic acid comprises a first dicarboxylic acid comprising terephthalic acid or a derivative thereof; and a second dicarboxylic acid comprising a C9 to C12 aliphatic dicarboxylic acid or a derivative thereof, the diol comprises a first diol comprising 2-methyl-1,3-propanediol; and a second diol comprising 1,6-hexanediol, and the first diol is employed in an amount of 40% by mole to 80% by mole based on 100% by mole of the entire diol components.

The process for preparing a copolymerized polyester resin of the present invention comprises (1) sequentially or simultaneously subjecting two or more dicarboxylic acid components and two or more diol components to an esterification reaction, and (2) polycondensing the reaction product, wherein the dicarboxylic acid comprises a first dicarboxylic acid comprising terephthalic acid or a derivative thereof; and a second dicarboxylic acid comprising a C9 to C12 aliphatic dicarboxylic acid or a derivative thereof, the diol comprises a first diol comprising 2-methyl-1,3-propanediol; and a second diol comprising 1,6-hexanediol, and the first diol is employed in an amount of 40% by mole to 80% by mole based on 100% by mole of the entire diol components.

The adhesive composition of the present invention comprises the copolymerized polyester resin, a second polyester resin having a hydroxyl group of 1.0 to 6.0 mg KOH/g, and a curing agent, wherein the composition comprises the copolymerized polyester resin in an amount of 5% by weight to 40% by weight, the second polyester resin in an amount of 1% by weight to 15% by weight, and the curing agent in an amount of 0.1% by weight to 5% by weight, based on the total weight of the entire adhesive composition.

Advantageous Effects of Invention

The copolymerized polyester resin of the present invention has a low glass transition temperature of 20° C. or lower suitable for adhesives and is improved in hydrolysis resistance, which is a disadvantage of conventional polyester resins having a low glass transition temperature.

In addition, the copolymerized polyester resin of the present invention does not involve cloudiness since side reactions of forming cyclic oligomers are suppressed, and it has excellent long-term solution storage performance.

The adhesive composition of the present invention, which comprises the copolymerized polyester resin, can be enhanced in adhesive strength in a range of low glass transition temperatures, hydrolysis resistance, solution storage stability, and hot water resistance.

The adhesive composition can be advantageously used for bonding various parts such as food packaging, electronic devices, and energy storage devices, specifically adhesives for vinyl coated metal, solar sheets, secondary battery pouches, and the like.

BRIEF DESCRIPTION OF DRAWINGS

FIG. 1 is a picture showing the degree of cloudiness of each copolymerized polyester resin after 6 months of performing a freeze-thaw test on the solution stability of the copolymerized polyester resin.

FIG. 2 shows the results of intrinsic viscosity (IV) retention over time at 65° C. and 100% relative humidity for each copolymerized polyester resin.

FIG. 3 shows the change in adhesive strength of a copolymerized polyester resin with respect to the content of a crosslinking agent.

FIG. 4 shows the results of evaluating the hot water resistance over time of a copolymerized polyester resin.

BEST MODE FOR CARRYING OUT THE INVENTION

The present invention will be described in detail with reference to the disclosures given below. The present invention is not limited to the disclosures given below, but it may be modified into various forms as long as the gist of the invention is not changed.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

Throughout the present specification, the terms first, second, and the like are used to describe various components. But the components should not be limited by the terms. The terms are used only for the purpose of distinguishing one component from another.

Polyester Resin

The copolymerized polyester resin of the present invention comprises a repeat unit derived from two or more dicarboxylic acid components and a repeat unit derived from two or more diol components, wherein the dicarboxylic acid comprises a first dicarboxylic acid comprising terephthalic acid or a derivative thereof; and a second dicarboxylic acid comprising a C9 to C12 aliphatic dicarboxylic acid or a derivative thereof, the diol comprises a first diol comprising 2-methyl-1,3-propanediol; and a second diol comprising 1,6-hexanediol, and the copolymerized polyester resin comprises the first diol in an amount of 40% by mole to 80% by mole based on 100% by mole of the entire diol components.

Dicarboxylic Acid Component

The dicarboxylic acid component of the present invention comprises a first dicarboxylic acid comprising terephthalic acid as an aromatic dicarboxylic acid or a derivative thereof; and a second dicarboxylic acid comprising a C9 to C12 aliphatic dicarboxylic acid or a derivative thereof.

Derivatives of the dicarboxylic acid component are alkyl esters of a dicarboxylic acid (which mean lower alkyl esters of C1 to C4 such as monomethyl, monoethyl, dimethyl, diethyl, or dibutyl esters) and acid anhydrides thereof.

The first dicarboxylic acid in an embodiment of the present invention comprises terephthalic acid or a derivative thereof. The first dicarboxylic acid may be employed in an amount of 60% by mole or less based on 100% by mole of the entire dicarboxylic acid components in light of reducing amorphousness and controlling solution viscosity.

Specifically, the first dicarboxylic acid may be employed in an amount of 40% by mole to 60% by mole based on 100% by mole of the entire dicarboxylic acid components. More specifically, the copolymerized polyester resin may comprise the first dicarboxylic acid in an amount of 40% by mole or more or 45% by mole or more, and 60% by mole or less, 55% by mole or less, 53% by mole or less, 51% by mole or less, or 50% by mole or less. For example, it may be employed in an amount of 40% by mole to 55% by mole, 45% by mole to 55% by mole, 45% by mole to 51% by mole, or 45% by mole to 50% by mole.

If the first dicarboxylic acid is employed in an amount less than the above range, amorphousness is excessively increased, which makes water penetration and diffusion easy, whereby water resistance particularly under high-temperature conditions, that is, hot water resistance is remarkably deteriorated. If it is employed in an amount exceeding the above range, the adhesive strength is remarkably deteriorated due to the increase in crystallinity, failing to satisfy the target performance.

The second dicarboxylic acid in an embodiment of the present invention comprises a C9 to C12 aliphatic dicarboxylic acid or a derivative thereof. If an aliphatic dicarboxylic acid of C8 or less is employed, hydrolysis resistance would be insufficient whereas glass transition temperature can be adjusted within the target range; thus, the change in molecular weight and intrinsic viscosity increases, and the solution storage stability would be significantly reduced.

The second dicarboxylic acid is at least one selected from the group consisting of azelaic acid, sebacic acid, dodecanedioic acid, and derivatives thereof. Azelaic acid or sebacic acid is preferred, and azelaic acid is most preferred, from the viewpoint of the adhesive strength of a polyester resin.

The second dicarboxylic acid may be employed in an amount of 10% by mole to 27% by mole based on 100% by mole of the entire dicarboxylic acid components. Specifically, the copolymerized polyester resin may comprise the second dicarboxylic acid in an amount of 10% by mole or more, 12% by mole or more, 14% by mole or more, or 15% by mole or more, and 27% by mole or less, 26% by mole or less, 25% by mole or less, 22% by mole or less, or 20% by mole or less. For example, it may be employed in an amount of 12% by mole to 25% by mole, 14% by mole to 22% by mole, 10% by mole to 20% by mole, or 15% by mole to 20% by mole.

If the second dicarboxylic acid is employed in an amount less than the above range, adhesive strength is deteriorated. If it is employed in an amount exceeding the above range, carbonyl groups derived from fatty acids that are vulnerable to hydrolysis are increased, which significantly impairs the water resistance and hot water resistance.

The copolymerized polyester resin in an embodiment of the present invention may comprise the first dicarboxylic acid in an amount of 40% by mole to 60% by mole and the second dicarboxylic acid in an amount of 10% by mole to 27% by mole.

In addition, the copolymerized polyester resin according to an embodiment of the present invention may comprise a third dicarboxylic acid other than the first dicarboxylic acid and the second dicarboxylic acid.

The third dicarboxylic acid may comprise at least one selected from the group consisting of isophthalic acid, naphthalene dicarboxylic acid, diphenyl dicarboxylic acid, and derivatives thereof.

The third dicarboxylic acid may be employed in an amount of 20% by mole to 50% by mole based on 100% by mole of the entire dicarboxylic acid components. Specifically, the copolymerized polyester resin may comprise the third dicarboxylic acid in an amount of 20% by mole or more, 25% by mole or more, 26% by mole or more, or 30% by mole or more, and 50% by mole or less, 45% by mole or less, 40% by mole or less, 37% by mole or less, or 35% by mole or less. For example, it may be employed in an amount of 20% by mole to 45% by mole, 25% by mole to 37% by mole, 30% by mole to 37% by mole, or 30% by mole to 35% by mole.

If the third dicarboxylic acid is employed in an amount less than the above range, solubility in solvents is deteriorated. If it is employed in an amount exceeding the above range, amorphousness may be lowered, which enhances the solution viscosity.

The copolymerized polyester resin in an embodiment of the present invention may comprise the first dicarboxylic acid in an amount of 40% by mole to 60% by mole, the second dicarboxylic acid in an amount of 10% by mole to 27% by mole, and the third dicarboxylic acid in an amount of 20% by mole to 50% by mole, based on 100% by mole of the entire dicarboxylic acid components.

Diol Component

The diol of the present invention comprises a first diol comprising 2-methyl-1,3-propanediol and a second diol comprising 1,6-hexanediol.

The first diol in an embodiment of the present invention comprises 2-methyl-1,3-propanediol.

The first diol may be employed in an amount of 40% by mole to 80% by mole based on 100% by mole of the entire diol components. Specifically, the copolymerized polyester resin may comprise the first diol in an amount of 40% by mole or more, 45% by mole or more, 50% by mole or more, 55% by mole or more, 60% by mole or more, 63% by mole or more, or 64% by mole or more, and 80% by mole or less, 75% by mole or less, 70% by mole or less, 68% by mole or less, or 66% by mole or less. More specifically, it may be employed in an amount of 50% by mole to 75% by mole, 60% by mole to 70% by mole, or 63% by mole to 68% by mole.

If the first diol is employed in an amount less than the above range, the solvent solubility and adhesive strength are deteriorated. If it is employed in an amount exceeding the above range, hydrolysis resistance is deteriorated.

The second diol in an embodiment of the present invention comprises 1,6-hexanediol.

The second diol may be employed in an amount of 20% by mole to 50% by mole based on 100% by mole of the entire diol components. Specifically, the copolymerized polyester resin may comprise the second diol in an amount of 20% by mole or more, 25% by mole or more, 30% by mole or more, 32% by mole or more, or 34% by mole or more, and 50% by mole or less, 45% by mole or less, 40% by mole or less, or 36% by mole or less. More specifically, it may be employed in an amount of 20% by mole to 45% by mole, 30% by mole to 40% by mole, or 32% by mole to 36% by mole.

If the second diol is employed in an amount within the above range, hydrolysis resistance and solution stability may be imparted to the copolymerized polyester resin, and the target adhesive strength may be achieved in an adhesive composition comprising the copolymerized polyester resin.

The copolymerized polyester resin according to an embodiment of the present invention may further comprise a third diol other than the first diol and the second diol.

The third diol may comprise at least one selected from the group consisting of ethylene glycol, 1,3-propanediol, propylene glycol, 1,4-butanediol, neopentyl glycol, 1,5-pentanediol, and 2,2-butylethyl-1,3-propanediol.

The third diol may be employed in an amount of 40% by mole or less, 30% by mole or less, or 20% by mole or less, based on 100% by mole of the entire diol components. If the third diol is employed in an amount within the above range, it is effective in controlling the glass transition temperature of the copolymerized polyester resin.

The copolymerized polyester resin in an embodiment of the present invention may comprise the second dicarboxylic acid and the second diol in a total amount of 30% by mole or less based on 100% by mole of the entire dicarboxylic acid components and the entire diol components. In such a case, it is advantageous for adjusting the glass transition temperature of the copolymerized polyester resin to 20° C. or lower.

For example, if the second dicarboxylic acid component is employed in an amount of 5% by mole, the second diol may be employed in an amount of 10 to 25% by mole. If the second dicarboxylic acid component is employed in an amount of 10% by mole, the second diol may be employed in an amount of 5 to 20% by mole. Specifically, the copolymerized polyester resin may comprise the second dicarboxylic acid and the second diol in a total amount of 15% by mole or more, 20% by mole or more, 24% by mole or more, 25% by mole or more, or 27% by mole or more, and 40% by mole or less, 35% by mole or less, 30% by mole or less, or 28% by mole or less, based on 100% by mole of the entire dicarboxylic acid components and the entire diol components. More specifically, they may be employed in an amount of 15% by mole to 30% by mole, 20% by mole to 30% by mole, 25% by mole to 30% by mole, or 25% by mole to 28% by mole.

If the second dicarboxylic acid and the second diol are employed in an amount within the above range, it is possible to improve the hydrolysis resistance due to an increase in the content of linear fatty acid components in the copolymerized polyester resin and to prevent cloudiness, thereby improving the solution storage stability, and satisfy the adhesive strength at the same time.

Cloudiness refers to a phenomenon in which small particulate precipitates are formed as time elapses after a polyester resin having a low glass transition temperature is dissolved in a solvent. Cloudiness may take place as cyclic oligomers composed of dimers of terephthalic acid and neopentyl glycol or trimers of isophthalic acid and ethylene glycol are produced by a side reaction, that is, back-biting polymerization that takes place in a polycondensation reaction process as the content of fatty acids in a polyester resin increases.

The copolymerized polyester resin in an embodiment of the present invention may further comprise a triprotic acid component and/or a trihydric alcohol component in addition to the dicarboxylic acid components and the diol components, if desired.

The triprotic carboxylic acid component may comprise trimellitic acid, trimellitic anhydride, and 1,2,4-benzene tricarbonic acid. The trihydric alcohol component may comprise glycerine, trimethylolethane, and trimethylolpropane.

In addition, the triprotic acid component and the trihydric alcohol component may be employed in an amount of 0% by mole to 5% by mole, 0.01% by mole to 1.1% by mole, 0.1% by mole to 1.0% by mole, 0.3% by mole to 1.0% by mole, 0.4% by mole to 0.8% by mole, or 0.5% by mole to 0.7% by mole, based on 100% by mole of the entire dicarboxylic acid components and the entire diol components.

If the triprotic acid component and the trihydric alcohol component are employed in an amount within the above range, it is possible to enhance the adhesive strength of an adhesive composition comprising the copolymerized polyester resin.

Crosslinking Agent

The copolymerized polyester resin in an embodiment of the present invention may further comprise a crosslinking agent. The use of an appropriate crosslinking agent can further enhance the hot water resistance and mechanical properties of the copolymerized polyester resin.

The crosslinking agent may be a conventional crosslinking agent used in the art. Preferably, a crosslinking agent having a trifunctional or higher functional group may be used.

Specifically, the crosslinking agent may be at least selected from the group consisting of polyprotic acid components such as trimellitic acid, trimellitic anhydride, 1,2,4-benzene tricarbonic acid, 1,2,4-cyclohexanetricarboxylic acid, 2,5,7-naphthalene tricarboxylic acid, 1,2,4-naphthalene tricarboxylic acid, 1,2,5-hexane tricarboxylic acid, and 1,2,7,8-octane tetrabasic carboxylic acid, anhydrides of the polyprotic acid components, and alkyl esters of the polyprotic acid components; at least one selected from the group consisting of polyhydric alcohol components such as glycerine, trimethylolethane, trimethylolpropane, 3,6,1,4-anhydro sorbitol, pentaerythrite, dipentaerythritol, tripentaerythritol, sucrose, 1,2,4-butantriol, 1,2,5-penta glycerine, 2-methyl glycerine, 2-methyl isophthalic acid, trihydroxy methyl or trimethylolpropane, and trihydroxy methyl benzene; and mixtures of the polyprotic acid components and the polyhydric alcohol components.

The crosslinking agent may be trimellitic acid or trimellitic anhydride and may be an alcohol-based triol such as glycerin, trimethylolethane, or trimethylolpropane.

The crosslinking agent may be employed in an amount of 0.01% by mole to 5% by mole based on 100% by mole of the entire dicarboxylic acid components and the entire diol components. Specifically, the copolymerized polyester resin may comprise the crosslinking agent in an amount of 0.01% by mole to 5% by mole, 0.1% by mole to 4% by mole, 0.1% by mole to 3% by mole, 0.1% by mole to 2.5% by mole, 0.2% by mole to 2% by mole, or 0.3% by mole to 1.0% by mole. It is more preferably employed in an amount of 0.3% by mole to 1.0% by mole in order to enhance the hot water resistance and mechanical properties of the copolymerized polyester resin and to achieve optimal adhesive strength.

Polycondensation Catalyst

The copolymerized polyester resin in an embodiment of the present invention may further comprise a polycondensation catalyst used for esterification or transesterification, if desired.

The polycondensation catalyst may comprise a catalyst commonly used in the art. For example, at least one selected from titanium, germanium, antimony, aluminum, and tin-based compounds may be used.

Stabilizer

The copolymerized polyester resin in an embodiment of the present invention may further comprise a stabilizer used for esterification or transesterification, if desired.

The stabilizer may comprise a conventional catalyst used in the art. For example, a phosphorus-based compound such as phosphoric acid, trimethyl phosphate, and triethyl phosphate may be used.

The amount of stabilizer added may be 10 to 200 ppm, as the weight of the phosphorus (P) element, relative to the weight of the copolymerized polyester resin.

If the amount of the stabilizer added is within the above range, the stabilizing effect of the reaction product is excellent, so that it is possible to prevent the discoloration of the copolymerized polyester resin and to obtain a copolymerized polyester resin having a desired degree of polymerization.

Other Additives

The copolymerized polyester resin in an embodiment of the present invention may be blended with other additives, if desired.

Examples of the additives may include any additives that can be generally added to copolymerized polyester resin compositions such as fillers, lubricants, plasticizers, colorants, antioxidants, flame retardants, defoaming agents, coupling agents, flowing agent, dispersants, UV absorbers, and antistatic agents. These additives may be used alone or in combination of two or more. The additives may be blended into the copolymerized polyester resin before or after the polycondensation reaction.

In the resin composition of the present invention, the amount of additives added is not particularly limited as long as it is within the range capable of achieving the effect of the present invention. The amount of the additives may be greater than 0% by weight to 5% by weight, respectively, based on the total weight of the resin composition. It is preferable that the total weight of the additives is 10% by weight or less based on the total weight of the resin composition.

Physical Properties of the Polyester Resin

The copolymerized polyester resin may have a glass transition temperature (Tg) of −10° C. to 20° C. If the glass transition temperature is lower than −10° C., the cohesive energy of the resin is too low to maintain strong adhesive strength and adhesive thermal resistance. On the other hand, if it exceeds 20° C., the flexibility of the adhesive composition is steeply reduced, making it difficult to be applied to film adhesion, so that its use may be significantly limited.

The glass transition temperature may be preferably 0° C. to 17° C. If the glass transition temperature of the copolymerized polyester resin is within the above range, the adhesive strength and flexibility of the adhesive composition are optimized.

The copolymerized polyester resin may have a number average molecular weight of 5,000 or more. If the number average molecular weight is less than 5,000, sufficient adhesive strength and flexibility required for the adhesive composition cannot be imparted.

The number average molecular weight may be preferably 10,000 to 30,000 or 15,000 to 25,000. If the number average molecular weight is outside the above range, the adhesive strength and flexibility are reduced, or the viscosity of the solution increases excessively during dissolution, so that it is difficult to achieve an effective range of solids content of an adhesive.

The copolymerized polyester resin may have a hydroxyl value of 6 to 15 mg KOH/g and an acid value of 0.1 to 3.0 mg KOH/g.

If the hydroxyl value and the acid value are within the above ranges, it is advantageous for achieving high adhesive strength and optimal performance when used as an adhesive resin with a curing agent.

The copolymerized polyester resin may have an intrinsic viscosity of 0.20 dl/g or more, 0.30 dl/g or more, or 0.40 dl/g or more.

The intrinsic viscosity (dl/g) is measured by dissolving a copolymerized polyester resin at a concentration of 1.2 g/dl in orthochlorophenol at 150° C. and using an Ubbelohde viscometer in a constant temperature bath at 35° C.

The copolymerized polyester resin may have a rate of change in intrinsic viscosity of 95% or more according to the following Equation 1.

Specifically, the rate of change in intrinsic viscosity may be 96% or more, 97% or more, 98% or more, or 99% or more.

$$\text{Rate of change in intrinsic viscosity } (\Delta IV) = \frac{|IV_6 - IV_0|}{IV_0} \times 100 \qquad \text{[Equation 1]}$$

In the above equation, $IV_0$ is the initial intrinsic viscosity (IV) of the copolymerized polyester resin, and $IV_6$ is the intrinsic viscosity (IV) measured after the copolymerized polyester resin has been stored at 65° C. and 100% relative humidity for 6 weeks.

If the rate of change in intrinsic viscosity is within the above range, the change in molecular weight due to hydrolysis is minimized; thus, when an adhesive resin is prepared and stored, or when it is made into a solution to be used, its stability is maintained, so that it can be used in conformity with its purpose and characteristics.

Process for Preparing a Polyester Resin

The copolymerized polyester resin may be prepared from the components as described above by a preparation process known in the art.

Specifically, the process for preparing a copolymerized polyester resin of the present invention comprises (1) sequentially or simultaneously subjecting two or more dicarboxylic acid components and two or more diol components to an esterification reaction, and (2) polycondensing the reaction product. Here, the dicarboxylic acid component, the diol component, and their contents are as described above.

Esterification Reaction Step

First, the process for preparing a copolymerized polyester resin of the present invention comprises sequentially or simultaneously subjecting two or more dicarboxylic acid components and two or more diol components to an esterification reaction. Here, the esterification reaction covers a transesterification reaction.

The esterification reaction step may be carried out under an inert gas atmosphere.

The esterification reaction step may be carried out at a pressure of 0.1 to 3.0 kgf/cm² and a temperature of 200 to 300° C. for an average residence time of 100 to 600 minutes. Specifically, the esterification reaction step may be carried out at a pressure of 0.2 to 2.0 kgf/cm² and a temperature of 240 to 270° C. for an average residence time of 120 to 500 minutes.

Reaction conditions of the esterification reaction step may be partially adjusted depending on the molar ratio of the first dicarboxylic acid, the second dicarboxylic acid, the first diol, and the second diol used.

In addition, in the esterification reaction step, a catalyst suitable for each step may be additionally used to shorten the reaction time.

Polycondensation Step

The process for preparing a copolymerized polyester resin of the present invention comprises polycondensing the reaction product prepared in the above esterification reaction step.

In the polycondensation step, a polycondensation catalyst, a stabilizer, and the like may be added to the reaction product.

The polycondensation step may be carried out under an inert gas atmosphere.

The polycondensation step may be carried out under a reduced pressure condition of 0.1 to 2.0 mmHg for a necessary time until a desired intrinsic viscosity is reached, for example, for an average residence time of 1 to 10 hours. The diol component, which is a by-product of the polycondensation reaction, may be removed through the reduced pressure condition. Specifically, the polycondensation step may be carried out at a temperature of 240° C. to 300° C., 250° C. to 290° C., or 260° C. to 270° C.

Adhesive Composition

The present invention provides a solvent-based adhesive composition comprising the copolymerized polyester resin as described above and an organic solvent.

The adhesive composition of the present invention may comprise the copolymerized polyester resin, a second polyester resin, and a curing agent.

The adhesive composition may comprise the copolymerized polyester resin and the second polyester resin in a total amount of 10 to 50% by weight or 20 to 40% by weight based on the total weight of the adhesive composition.

If the total amount of the copolymerized polyester resin and the second polyester resin is within the above range, the initial tack of the adhesive layer upon drying and curing is appropriate, and cohesive energy is increased, so that adhesive strength can be enhanced.

The adhesive composition may comprise the copolymerized polyester resin in an amount of 5% by weight to 40% by weight, the second polyester resin in an amount of 1% by weight to 15% by weight, and the curing agent in an amount of 0.01% by weight to 5% by weight, based on the total weight of the adhesive composition.

Second Polyester Resin

The adhesive composition of the present invention may comprise a second polyester resin.

In order to impart sufficient adhesive strength and flexibility required for the adhesive composition, the number average molecular weight of the second polyester resin may be 10,000 to 30,000, 15,000 to 25,000, or 20,000 to 22,000.

The second polyester resin may have a hydroxyl value of 1.0 to 6.0 mg KOH/g.

When the second polyester resin is dissolved at a concentration of 1.2 g/dl in orthochlorophenol at 150° C., and its intrinsic viscosity (dl/g) is then measured using an Ubbelohde viscometer in a constant temperature bath at 35° C., the intrinsic viscosity may be 0.20 dl/g or more, 0.40 dl/g or more, or 0.60 dl/g or more.

The second polyester resin may have a glass transition temperature (Tg) of 20 to 100° C., 30 to 90° C., 40 to 80° C., or 60 to 70° C.

The second polyester resin may have a softening temperature of 110° C. or higher, 120° C. or higher, 130° C. or higher, or 140° C. or higher.

Curing Agent or Curing Catalyst

The adhesive composition of the present invention may comprise an isocyanate-based curing agent, along with the copolymerized polyester resin, in order to achieve enhanced performance in forming an adhesive film (coating layer). Common isocyanates can be used without limitation.

The isocyanate curing agent may include at least one mixture selected from isophorone diisocyanate (IPDI), hexamethylene diisocyanate (HDI), toluene diisocyanate (TDI), diphenylmethane diisocyanate (MDI), xylene diisocyanate (XDI), or polymers thereof; and copolymers obtained by polyfunctionalizing them through a reaction for trimethylol propane adduct, biuret, and isocyanurate.

The amount of the curing agent added may be 0.01 to 5% by weight or 0.1 to 5% by weight, preferably 0.5 to 3% by weight, based on the total weight of the adhesive composition.

If the amount of the curing agent added is less than the above range, the hot water resistance of an adhesive layer is not achieved. If the amount exceeds the above range, the adhesive loses flexibility due to excessive curing density, and its wetting and adhesive strength to adherends decrease.

A curing catalyst may be added to accelerate the curing of a coating film. An amine-based or tin-based curing catalyst may be used. A tin-based curing catalyst is more effective in achieving the performance of the adhesive composition according to the present invention.

At least one selected from the combination consisting of dibutyltin dilaurate (DBTDL), tin tetrachloride (SnCl4), butyltin trichloride, dibutyltin oxide, dibutyltin bis(2-ethylhexanoate), and the like may be used as the tin-based curing catalyst.

The amount of the curing catalyst may be 0.1 to 1.5% by weight based on the total amount of the adhesive composition. It is preferable that the amount is in the range of 0.1 to 1.0% by weight to control the curing process and achieve sufficient adhesive strength.

If the amount of the curing catalyst used exceeds 1.5% by weight, excessive curing takes place during the drying process, resulting in a steep increase in the activation temperature of an adhesive film, thereby causing a decrease in the adhesive strength during a lamination process.

Solvent

Specifically, the organic solvent may be selected from the group consisting of aromatic hydrocarbons, glycol esters, glycol ethers, ketones, alcohols, and mixtures thereof.

The aromatic hydrocarbon-based solvent may be, for example, a commercial solvent including toluene, xylene, Kokosol-100, or Kokosol-150 (manufacturer: SK Energy Co., Ltd.).

The glycol ester-based solvent may be, for example, ethyl acetate, butyl acetate, cellosolve acetate, propylene glycol monomethyl acetate, ethylene glycol diacetate, ethylene glycol, diethyl ether, ethylene glycol dimethyl ether, ethylene glycol monobutyl ether, ethylene glycol monoethyl ether, 3-methoxybutyl acetate, or the like.

The glycol ether-based solvent may be, for example, methyl cellosolve, ethyl cellosolve, ethylene glycol butyl ether, diethylene glycol methyl ether, diethylene glycol ethyl ether, diethylene glycol butyl ether, or the like.

The ketone-based solvent may be, for example, acetone, acetonitrile, methyl ethyl ketone, methyl isobutyl ketone, cyclohexanone, or the like.

The alcohol-based solvent may be, for example, ethanol, isopropanol, n-butanol, amyl alcohol, cyclohexanol, or the like.

In addition, chloroform, cresol, hexane, tetrahydrofuran, isophorone, or dibasic ester may also be used as the organic solvent.

The solvent may be employed in an amount of 60 to 90% by weight, specifically, 40 to 70% by weight, based on the total weight of the adhesive composition.

If the content of the solvent is within the above range, it has the advantage of having an appropriate viscosity for use as an adhesive composition, so that the smoothness of a coating film thus formed is excellent, and drying time is shortened when the film is formed.

Physical Properties of the Adhesive Composition

The adhesive composition may have an adhesive strength of 3.00 to 10.00 N/cm.

Specifically, the adhesive strength may be 3.40 to 8.50 N/cm, 3.45 to 7.00 N/cm, 3.50 to 6.70 N/cm, or 3.51 to 6.61 N/cm.

If the adhesive strength is within the above range, adhesive strength that meets the various target uses described above is achieved.

The adhesive composition has a rate of change in adhesive strength of 50% or less according to the following Equation 2.

Specifically, it may be 40% or less, 30% or less, 25% or less, 20% or less, or 10% or less.

$$\text{Rate of change in adhesive strength } (\Delta A) = \quad \text{[Equation 2]}$$
$$\frac{|A_{24} - A_0|}{A_0} \times 100$$

In the above equation, $A_0$ is the initial adhesive strength, and $A_{24}$ is the adhesive strength measured after 24 hours of heating at 4° C./minute and pressurizing to reach 121° C. and 1.5 atm in an autoclave.

If the rate of change in adhesive strength is in the above range, the adhesive strength can be maintained at a certain level even when treated at high temperatures for a long period of time. Thus, the adhesive composition with enhanced high-temperature retort resistance, can be advantageously used for bonding applications in manufacturing various parts such as food packaging, electronic devices, and energy storage devices.

MODE FOR THE INVENTION

Hereinafter, the present invention will be described in more detail with reference to the following examples. However, these examples are set forth to illustrate the present invention, and the scope of the present invention is not limited thereto.

EXAMPLE

In the following examples and comparative examples, TPA refers to terephthalic acid, IPA refers to isophthalic acid, AzA refers to azelaic acid, SA refers to sebacic acid, AA refers to adipic acid, EG refers to ethylene glycol, NPG refers to neopentyl glycol, 2-MPD refers to 2-methyl-1,3-propanediol, DEG refers to di-ethylene glycol, BEPD refers to 2-butyl-2-ethyl-1,3-propanediol, and 1,6-HD refers to 1,6-hexanediol.

<Preparation of a Copolymerized Polyester Resin>

Example 1

A 1-liter, three-necked flask was charged with 210 g of TPA, 147 g of IPA, and 71 g of AzA as dicarboxylic acid components and 240 g of 2-MPD and 105 g of HD as diol components. 0.06 g of tetrabutyl titanate (C31) as a catalyst was added thereto, and an esterification reaction was carried out under a pressurized condition of 1 kgf/cm² and at 260° C. for 240 minutes. As the esterification reaction proceeded, when 100 g of water as a by-product was discharged from the system, 0.04 g of tetrabutyl titanate as a catalyst was added thereto, and a polycondensation reaction was carried out. The polycondensation reaction was carried out under a reduced pressure of 1.0 mmHg and at 270° C. When a certain viscosity (intrinsic viscosity of 0.5 dl/g) was reached, the polymerization was terminated to obtain a desired copolymerized polyester resin.

Examples 2 to 4 and Comparative Examples 1 to 10

Copolymerized polyester resins were each prepared in the same manner as in Example 1, except that the components and contents shown in Table 1 below were used.

<Preparation of an Adhesive Composition>

Examples 1a to 4a and Comparative Examples 1a to 10a

The copolymerized polyester resins of Examples 1 to 4 and Comparative Examples 1 to 10 were each dissolved in an ethyl acetate (manufacturer: SK Chemicals) solvent at a concentration of 27% by weight, which was mixed with a solution of 27% by weight of a hard-type second polyester resin ES-100 or ES-110 (manufacturer: SK Chemicals) at a weight ratio of 75:25 to prepare a solution for measuring adhesion. 100 g of the solution for adhesion measurement was mixed with 1.08 g of a curing agent (manufacturer: Aekyung, product name: AK75C) to prepare an adhesive composition.

Examples 1b to 4b and 1c to 4c

Copolymerized polyester resins were each prepared in the same manner as in Example 1, except that trimellitic anhydride (TMA) as a crosslinking agent was added in an amount of 0.6% by mole or 1.2% by mole in the synthesis of the copolymerized polyester resins of Examples 1 to 4 as shown in Table 3 below to increase the crosslinking degree in the resin. Then, adhesive compositions were each prepared as shown in Table 3.

Test Example

The performance of the copolymerized polyester resins and the adhesive compositions prepared in the above Examples and Comparative Examples were evaluated, as follows.

Test Example 1: Glass Transition Temperature (Tg)

The glass transition temperature (Tg) was measured during the second scan at a heating rate of 10° C./minute using a differential scanning calorimeter (DSC).

Test Example 2: Intrinsic Viscosity (IV)

The intrinsic viscosity (dl/g) was measured by dissolving a copolymerized polyester resin at a concentration of 1.2 g/dl in orthochlorophenol at 150° C. and using an Ubbelohde viscometer in a constant temperature bath at 35° C.

Test Example 3: Solution Stability (Freeze-Thaw Test)

An ethyl acetate solvent, which has relatively low solubility of a polyester resin, among low-boiling point solvents commercially used in adhesive applications was chosen as a solvent. The copolymerized polyester resins at a concentration of 50% by weight were each stirred until the resin was completely dissolved.

The completely dissolved solution was alternately stored at −20° C. and room temperature (23° C.) at an interval of 1 week for 6 months to visually observe whether cloudiness or precipitate was present through the storage stability test (freeze-thaw test).

When no cloudiness (o) was observed after 6 months of storage as shown in (a) of FIG. 1, when a small amount of cloudiness or precipitate (Δ) was observed as shown in (b) of FIG. 1, and when a large amount of precipitate in a thick precipitate layer (x) was observed (c) of FIG. 1, they are marked in Table 1 above.

Test Example 4: Evaluation of Hydrolysis Resistance

The copolymerized polyester resins of the Examples and Comparative Examples were each made into a film having a thickness of 1 mm using a hot press. A tray containing water was placed in an oven at 65° C., and a polyester film with a thickness of 1 mm was immersed therein to create an environment of a constant temperature of 65° C. and a constant relative humidity of 100%. Intrinsic viscosity (IV) was measured at an interval of one week, including the initial intrinsic viscosity, and the degree of hydrolysis resistance was compared by obtaining the intrinsic viscosity retention rate relative to the initial value.

Test Example 5: Evaluation of Adhesion Performance

For the preparation of a specimen, a PET film (corona treatment, 75 μm) was used as a substrate, the adhesive compositions were each coated on the substrate such that the dried coating film thickness was 7 to 9 μm, and the substrate was dried at 120° C. for 45 seconds through a Matisse oven. The first preliminary bonding was carried out through a simple laminator, and the second thermal bonding was carried out at 130° C. After it was aged for 1 day at room temperature, an adhesion test was performed.

The adhesion test was carried out using a UTM (Instron), and the head speed was 1/10 (1 inch/minute) of the ASTM standard (10 inch/minute) to minimize fracture of the PET (75 μm) substrate. Data were presented as average values of peel strength (N/cm) between 20 mm and 100 mm.

Test Example 6: Evaluation of Hot Water Resistance

A PET film was prepared in which the adhesive compositions of Examples 1a and 3a and Comparative Example 1a were each bonded in the same manner as in Test Example 5. It was heated at 4° C./minute and pressurized to reach 121° C. and 1.5 atm using a sterilization autoclave. The adhesive strength was tested after storage under hot water conditions at an 8-hour interval.

TABLE 1

| (Unit: % by mole) | Dicarboxylic acid component (100% by mole) | | | | | Diol component (100% by mole) | | | | | Glass transition temp. (° C.) | Solution stability |
|---|---|---|---|---|---|---|---|---|---|---|---|---|
| | TPA | IPA | SA | AzA | AA | 2-MPD | 1,6-HD | BEPD | EG | NPG | | |
| Ex. 1 | 50 | 35 | — | 15 | — | 65 | 35 | — | — | — | 13.5 | o |
| Ex. 2 | 50 | 35 | 15 | — | — | 65 | 35 | — | — | — | 10.3 | o |
| Ex. 3 | 50 | 30 | — | 20 | — | 65 | 35 | — | — | — | 3.8 | o |
| Ex. 4 | 50 | 30 | 20 | — | — | 65 | 35 | — | — | — | 2.9 | o |
| C. Ex. 1 | 32 | 60 | — | 8 | — | 60 | 40 | — | — | — | 16.1 | o |
| C. Ex. 2 | 32 | 60 | 8 | — | — | 60 | 40 | — | — | — | 16.2 | o |
| C. Ex. 3 | 32 | 60 | — | 8 | — | 80 | 20 | — | — | — | 24.8 | o |
| C. Ex. 4 | 30 | 50 | — | 20 | — | 60 | — | 40 | — | — | 17.5 | o |
| C. Ex. 5 | 52 | 40 | 8 | — | — | 80 | 20 | — | — | — | 23.9 | o |
| C. Ex. 6 | 50 | 22 | 28 | — | — | — | — | — | 50 | 50 | 18.1 | Δ |
| C. Ex. 7 | 50 | 50 | — | — | — | — | 46 | — | 54 | — | 30.0 | x |
| C. Ex. 8 | 30 | 70 | — | — | — | 15 | 85 | — | — | — | 12.5 | Δ |
| C. Ex. 9 | 30 | 30 | — | — | 40 | — | — | — | 40 | 60 | 12.4 | x |
| C. Ex. 10 | 30 | 50 | 20 | — | — | 50 | 50 | — | — | — | −7.8 | x |

As can be seen from the results of Table 1 above, when the copolymerized polyester resin contains a certain range of a second dicarboxylic acid (C9 to C12 aliphatic dicarboxylic acid), cloudiness did not take place even after long-term storage. However, when ethylene glycol or neopentyl glycol was used in combination with greater than 27% by mole of an aliphatic dicarboxylic acid to lower the glass transition temperature of the copolymerized polyester resin (Comparative Examples 6 and 9), or when an excessive amount of 1,6-hexanediol was used (Comparative Example 8), cloudiness took place during storage in a solution state, resulting in poor storage stability.

In particular, in the copolymerized polyester resins of Comparative Examples 6 and 7, a dimer of terephthalic acid and neopentyl glycol (Comparative Example 6) and a trimer of isophthalic acid and ethylene glycol (Comparative Examples 6 and 7), which are regarded as the main cause of cloudiness in a solution, could be formed, resulting in cyclic oligomers during the storage of the solution. It was confirmed through the solution stability test that cloudiness or a large amount of precipitates was present during the storage of the solution.

In Comparative Example 10, the total amount of the second dicarboxylic acid and the second diol was 35% by mole based on 100% by mole of the entire dicarboxylic acids and the entire diols. In such a case, the glass transition temperature of the copolymerized polyester resin was decreased to below zero.

FIG. 2 shows the results of intrinsic viscosity (IV) retention over time at 65° C. and 100% relative humidity for each of the copolymerized polyester resins of Examples 1 to 4 and Comparative Examples 1 to 9.

Referring to FIG. 2, the copolymerized polyester resins of Examples 1 to 4 and Comparative Examples 1 to 5 in which 27% by mole or less of the second dicarboxylic acid was employed in the copolymerized polyester resin of the present invention, the intrinsic viscosity (IV) was maintained to 95% or more even after storage for 6 weeks. In contrast, the copolymerized polyester resins of Comparative Examples 3 and 5 had a glass transition temperature exceeding 20° C. In the copolymerized polyester resins of Comparative Examples 6 to 9, the content of an aliphatic dicarboxylic acid in the resin was less than 10% by mole or greater than 27% by mole, or a C6 aliphatic dicarboxylic acid (e.g., adipic acid) was used, in which case the IV was relatively significantly decreased during the 6-week storage test.

It is understood from Table 1 and FIG. 2 that if the type and content of fatty acids in the polyester adhesive resin are strictly controlled, and 1,6-hexanediol is properly used in combination, a resin composition having excellent hydrolysis resistance can be obtained while a low glass transition temperature is maintained.

TABLE 2

| | Adhesive composition | | | | | | |
|---|---|---|---|---|---|---|---|
| | Ex. 1a | Ex. 2a | Ex. 3a | Ex. 4a | C. Ex. 1a | C. Ex. 2a | C. Ex. 3a |
| Adhesive strength (N/cm) | 5.59 | 3.62 | 4.05 | 3.51 | 3.35 | 2.96 | 2.73 |

TABLE 2-continued

| | Adhesive composition | | | | | | |
|---|---|---|---|---|---|---|---|
| | C. Ex. 4a | C. Ex. 5a | C. Ex. 6a | C. Ex. 7a | C. Ex. 8a | C. Ex. 9a | C. Ex. 10a |
| Adhesive strength (N/cm) | 1.48 | 2.79 | 2.89 | 0.00 | 2.78 | 1.93 | 0.80 |

As can be seen from the results of Table 2 above, when 10% by mole or less of the second dicarboxylic acid was employed to adjust the Tg to 20° C. or lower (Comparative Examples 1a to 3a and 5a), the adhesive strength was low. In Comparative Examples 3a and 5a, the Tg exceeded 20° C. as well.

Even when 20% by mole of the second dicarboxylic acid was employed, the adhesive strength was greatly reduced when the Tg was adjusted without employing 1,6-hexanediol (Comparative Example 4a).

Meanwhile, in Comparative Examples 6a and 9a, in which hydrolysis resistance was reduced and cloudiness was observed due to the use of an excessive amount of an aliphatic dicarboxylic acid, the adhesive strength was reduced when 2-methyl-1,3-propanediol and 1,6-hexanediol were not used as a diol component.

In addition, when it was attempted to adjust Tg only with 1,6-hexanediol without using an aliphatic dicarboxylic acid at all (Comparative Examples 7a and 8a), no adhesive characteristics were achieved, or the adhesive strength was remarkably decreased.

Accordingly, it is confirmed from Table 2 that only when a second dicarboxylic acid having a relatively long chain and 1,6-hexanediol and 2-methyl-1,3-propanediol are used as essential components in appropriate proportions, it is possible to satisfy water resistance and solution storage stability, as well as adhesive strength, which is the most important physical property as an adhesive, at the same time.

FIG. 4 shows the results of evaluating the hot water resistance of a copolymerized polyester resin.

As shown in FIG. 4, PET film fracture took place after 24 hours. The adhesive compositions of Examples 1a and 3a maintained 50% or more of the initial adhesive strength even after evaluation of hot water resistance and showed an adhesive strength of 3.0 N/cm or more.

TABLE 3

| Adhesive composition | Copolymerized polyester resin | TMA Content (% by mole) | Adhesive strength (N/cm) |
|---|---|---|---|
| Ex. 1a | Ex. 1 | 0 | 5.59 |
| Ex. 1b | | 0.6 | 6.61 |
| Ex. 1c | | 1.2 | 4.34 |
| Ex. 2a | Ex. 2 | 0 | 3.62 |
| Ex. 2b | | 0.6 | 4.16 |
| Ex. 2c | | 1.2 | 3.54 |
| Ex. 3a | Ex. 3 | 0 | 4.05 |
| Ex. 3b | | 0.6 | 5.56 |
| Ex. 3c | | 1.2 | 3.88 |
| Ex. 4a | Ex. 4 | 0 | 3.51 |
| Ex. 4b | | 0.6 | 3.83 |
| Ex. 4c | | 1.2 | 2.38 |

The change in adhesive strength of a crosslinked copolymerized polyester resin with respect to the content of a crosslinking agent is shown in Table 3 above and FIG. 3.

As shown in Table 3, the adhesive strength of the resin was increased as an appropriate amount of a crosslinking agent was added to the resins of Examples 1 and 4.

The adhesive strength was increased the most when the content of TMA added was 0.6% by mole relative to the polyester resin, whereas the adhesive strength was slightly lowered than when it was not added when more than 1% by mole thereof was added. This is attributed to the fact that over-branching causes over-curing in the dry curing process, making it difficult to activate an adhesive layer by heat during the subsequent process of adhesive lamination.

In addition, in order to further increase the adhesive strength of the copolymerized polyester resins of Examples 1 to 4 through modification of the composition, azelaic acid is preferred to sebacic acid. The adhesive strength is increased the most when the second dicarboxylic acid component is employed in an amount of 7.5% by mole.

In sum, the above results show that the copolymerized polyester resin of the present invention has a low glass transition temperature suitable for adhesive applications, excellent long-term solution storage performance by virtue of the suppressed side reaction of forming cyclic oligomers, and remarkably enhanced hydrolysis resistance.

The adhesive composition comprising the copolymerized polyester resin has excellent hydrolysis resistance and enhanced high-temperature retort resistance; thus, it can be advantageously used for bonding applications in manufacturing various parts such as food packaging, electronic devices, and energy storage devices.

The invention claimed is:

1. A copolymerized polyester resin, which comprises a repeat unit derived from two or more dicarboxylic acid components and a repeat unit derived from two or more diol components,
   wherein the two or more dicarboxylic acid components comprise a first dicarboxylic acid comprising terephthalic acid or a derivative thereof; and a second dicarboxylic acid comprising a C9 to C12 aliphatic dicarboxylic acid or a derivative thereof,
   wherein the two or more diol components comprise a first diol comprising 2-methyl-1,3-propanediol; and a second diol comprising 1,6-hexanediol,
   wherein the first diol is included in an amount of 40% by mole to 80% by mole based on 100% by mole of entire diol components, and
   wherein the second dicarboxylic acid and the second diol are included, in total, in a combined total amount of 30% by mole or less based on 100% by mole of a total of entire dicarboxylic acid components and the entire diol components.

2. The copolymerized polyester resin of claim 1, which comprises the second diol in an amount of 20% by mole to 50% by mole based on 100% by mole of the entire diol components.

3. The copolymerized polyester resin of claim 1, which comprises the first dicarboxylic acid in an amount of 40% by mole to 60% by mole and the second dicarboxylic acid in an amount of 10% by mole to 27% by mole, each based on 100% by mole of the entire dicarboxylic acid components.

4. The copolymerized polyester resin of claim 1, wherein the two or more dicarboxylic acid components comprise a third dicarboxylic acid other than the first dicarboxylic acid and the second dicarboxylic acid, and
   wherein the third dicarboxylic acid comprises one or more selected from the group consisting of isophthalic acid, naphthalene dicarboxylic acid, diphenyl dicarboxylic acid, and derivatives thereof.

5. The copolymerized polyester resin of claim 4, which comprises the third dicarboxylic acid in an amount of 20% by mole to 50% by mole based on 100% by mole of the entire dicarboxylic acid components.

6. The copolymerized polyester resin of claim 1, wherein the second dicarboxylic acid is selected from the group consisting of azelaic acid, sebacic acid, dodecanedioic acid, and derivatives thereof.

7. The copolymerized polyester resin of claim 1, wherein the two or more diol components comprise a third diol other than the first diol and the second diol, and
   the third diol comprises one or more selected from the group consisting of ethylene glycol, 1,3-propanediol, propylene glycol, 1,4-butanediol, neopentyl glycol, 1,5-pentanediol, and 2,2-butylethyl-1,3-propanediol.

8. The copolymerized polyester resin of claim 7, which comprises the third diol in an amount of 40% by mole or less based on 100% by mole of the entire diol components.

9. The copolymerized polyester resin of claim 1, which comprises a crosslinking agent having a trifunctional or higher functional group, in an amount of 0.01% by mole to 5% by mole based on 100% by mole of the total of the entire dicarboxylic acid components and the entire diol components.

10. The copolymerized polyester resin of claim 1, which has a glass transition temperature (Tg) of −10° C. to 20° C.

11. The copolymerized polyester resin of claim 1, which has a number average molecular weight of 5,000 or more.

12. The copolymerized polyester resin of claim 1, which has a rate of change in intrinsic viscosity of 95% or more according to the following Equation 1:

$$\text{Rate of change in intrinsic viscosity } (\Delta IV) = \qquad \text{[Equation 1]}$$
$$\frac{|IV_6 - IV_0|}{IV_0} \times 100$$

in the above equation, $IV_0$ is the initial intrinsic viscosity (IV) of the copolymerized polyester resin, and $IV_6$ is the intrinsic viscosity (IV) measured after the copolymerized polyester resin has been stored at 65° C. and 100% relative humidity for 6 weeks.

13. A process for preparing a copolymerized polyester resin, which comprises (1) sequentially or simultaneously subjecting two or more dicarboxylic acid components and two or more diol components to an esterification reaction, and (2) polycondensing the reaction product,
   wherein the two or more dicarboxylic acid components comprise a first dicarboxylic acid comprising terephthalic acid or a derivative thereof; and a second dicarboxylic acid comprising a C9 to C12 aliphatic dicarboxylic acid or a derivative thereof,
   wherein the two or more diol components comprise a first diol comprising 2-methyl-1,3-propanediol; and a second diol comprising 1,6-hexanediol,
   wherein the first diol is employed in an amount of 40% by mole to 80% by mole based on 100% by mole of a total amount of entire diol components, and
   wherein the second dicarboxylic acid and the second diol are included in a total amount of 30% by mole or less based on 100% by mole of a total of entire dicarboxylic acid components and the entire diol components.

14. An adhesive composition, which comprises the copolymerized polyester resin of claim 1, a second polyester resin having a hydroxyl group of 1.0 to 6.0 mg KOH/g, and a curing agent,
   wherein the adhesive composition comprises the copolymerized polyester resin in an amount of 5% by weight to 40% by weight, the second polyester resin in an amount of 1% by weight to 15% by weight, and the curing agent in an amount of 0.01% by weight to 5% by weight, based on a total weight of the adhesive composition.

15. The adhesive composition of claim 14, which has an adhesive strength of 3.00 to 10.00 N/cm.

16. The adhesive composition of claim 14, which has a rate of change in adhesive strength of 50% or less according to the following Equation 2:

$$\text{Rate of change in adhesive strength } (\Delta A) = \frac{|A_{24} - A_0|}{A_0} \times 100$$ [Equation 2]

in the above equation, $A_0$ is the initial adhesive strength of the adhesive composition, and $A_{24}$ is the adhesive strength of the adhesive composition measured after 24 hours of heating at 4° C./minute and pressurizing to reach 121° C. and 1.5 atm in an autoclave.

\* \* \* \* \*